US005539864A

United States Patent [19]

Hauck et al.

[11] Patent Number: 5,539,864

[45] Date of Patent: Jul. 23, 1996

[54] METHOD OF AUTOMATICALLY CONTROLLING OR REGULATING A CHRONOLOGICAL SEQUENCE OF OPERATING ACTIVITIES OR OPERATIONS OF A PRINTING PRESS

[75] Inventors: Dieter Hauck, Eberbach; Reinhard Janzer, Bruchsal; Anton Rodi, Leimen; Edmund Schramek, Sinsheim, all of Germany

[73] Assignee: Heidelberger Druckmaschinen AG, Heidelberg, Germany

[21] Appl. No.: 117,613

[22] Filed: Sep. 7, 1993

[30] Foreign Application Priority Data

Sep. 4, 1992 [DE] Germany .......................... 42 29 645.5

[51] Int. Cl.$^6$ .................................................... G06K 15/00

[52] U.S. Cl. ............................................ 395/105; 395/101

[58] Field of Search .................................... 395/105, 104, 395/101, 106, 102, 103, 107, 108, 109, 111, 112, 114, 117, 115; 364/471, 476, 468, 460; 101/91, 484, 485; 346/2; 347/4; 400/29, 61

[56] References Cited

U.S. PATENT DOCUMENTS

| | | | |
|---|---|---|---|
| 3,525,858 | 8/1970 | Thiede et al. | 395/105 |
| 3,913,719 | 10/1975 | Frey | 395/104 |
| 4,643,414 | 2/1987 | Weisgerber . | |
| 4,665,498 | 5/1987 | Buschman et al. . | |

FOREIGN PATENT DOCUMENTS

| | | |
|---|---|---|
| 3406924 | 1/1985 | Germany . |
| 3432879 | 6/1985 | Germany . |
| 3413179 | 10/1985 | Germany . |
| 3836310 | 4/1990 | Germany . |
| 3842390 | 6/1990 | Germany . |
| 285759 | 1/1991 | Germany . |
| 4013106 | 12/1991 | Germany . |
| 2225556 | 6/1990 | United Kingdom . |

*Primary Examiner*—Raymond J. Bayerl
*Assistant Examiner*—Dov Popovici
*Attorney, Agent, or Firm*—Herbert L. Lerner; Laurence A. Greenberg

[57] ABSTRACT

Method of automatically controlling and regulating a chronological sequence of operations of a printing press includes initializing in RAM of a computer a list entered from ROM and having a table of all press operation data necessary for printing, including an assignment of times for actuating actuators to position data of the printing carrier, modifying the data entered into the list in accordance with data regarding the machine status, and with respect to process values relative to a position of the printing carrier at which a performance of an operation should start, a first press operation to be performed being defined and, included in the data for every operation is the operation to be performed preceding and subsequent thereto and, upon reaching a starting position of each actual operation to be performed in accordance with actual data from the speed sensor, with the data about the machine status and with the process values, and redetermining in the computer and entering into the list the data for the position at the start of the performance of the actual operation, and the data for the operation preceding and subsequent to the actual operation, and if a shifting of the performance sequence is necessary, redetermining the data of the future preceding and subsequent operations. If the redetermined position chronologically comes after the starting position, the respective operation skipped in the performance sequence, and if the redetermined position chronologically comes before the starting position, the respective operation is performed from the starting position.

1 Claim, 3 Drawing Sheets

METHOD OF AUTOMATICALLY CONTROLLING OR REGULATING A CHRONOLOGICAL SEQUENCE OF OPERATING ACTIVITIES OR OPERATIONS OF A PRINTING PRESS

The invention relates to a process of automatically controlling or regulating a chronological sequence of operating activities or operations of a printing press.

During the operation of a printing press, a number of actuating and switching activities occur, the chronological sequence of which is determined by a machine control. Modern machine controls include at least one computer and several input and output (I/O) ports for signals. A program stored in memory controls the processing of signals transmitted via the input port to the machine control from sensors which, in the printing press, monitor the operating activities or operations of the press, as well as of signals transmitted via the input port from devices for inputting various process values.

With high speed printing presses, in particular, the effects of the dead and delay times associated with each actuator and switching or control element, respectively, on the starting time for each operating activity or operation can no longer be ignored.

With the device for throwing-on and throwing-off a blanket cylinder of an offset printing press as disclosed in German Patent DE 40 13 106 C1, the switching times for pneumatic cylinders are advanced or shifted in accordance with or as a function of the speed of the machine, so that the throwing-on and throwing-off of the blanket and plate cylinder and impression cylinder, respectively, occurs in the vicinity of respective opposing cylinder gaps. The advancement or shifting of the switching times is effected by a control device which, by means of a computer, processes signals and sensors for determining the reaction time of the actuator for the blanket cylinder, in addition to processing signals from a sensor for the angular position or setting of the impression cylinder and from a sensor for the speed of the printing unit. The control device, when determining the switching times, includes in its calculations the measured values for the dead time and lifting time of the actuator. In one procedure described in the German patent, the switching times for throw-on and throw-off are calculated once at press start-up for specific speed ranges and stored in memory. Each cell of the memory can be addressed by the speed signal, i.e., the values written there, and thus the value corresponding to the respective speed range, are accessible after simple addressing.

The number of speed ranges is limited, however, with this heretofore known device of the German patent, adjustment of the switching times over the entire speed range being possible only in stages. Furthermore, a determination of the switching times at a speed bordering two speed ranges is critical due to the tolerances for the determination of the reaction time of the actuator.

A further disadvantage is that the control unit only processes signals from an angle transmitter and a speed sensor, so that it is impossible to control switching times and actuating processes and other operating activities or operations, respectively, in accordance with signals from other machines or signals dependent upon process parameters. The same limitations or restrictions with regard to flexibility are evident in further solutions proposed in the prior art, namely in published German patent documents DE 34 06 924 A1, DE 34 32 879 A1, DE 38 36 310 A1, DE 34 13 179 A1, DD 2 85 759 A1 and DE 38 42 390 A1, for example.

It is accordingly an object of the invention to provide a method of controlling or regulating operating activities or operations of a printing press with which accuracy and flexibility are improved depending upon a number of machine and process parameters.

With the foregoing and other objects in view, there is provided, in accordance with the invention, a method of automatically controlling and regulating a chronological sequence of operations of a printing press, which includes continuously determining a position of a printing carrier with respect to a reference location by means of a digital position measurement system, continuously measuring a transport speed of the printing carrier along a transport path, a printing speed of the press, or a speed of elements in a drive system of the printing press by means of a digital speed sensor, inputting data from the position measurement system and the speed sensor into a computer constituting a component of a control of the press, inputting additional on-line data regarding the press status from sensors, and off-line data about process values into the computer, and relaying speed and acceleration-dependent signals to actuators for initiating operations of the press by means of an electronic output unit connected to the computer, when the printing carrier reaches a given position, and which comprises a first step of initializing in RAM of the computer a list entered from ROM and having a table of all press operation data necessary for printing, including an assignment of times for actuation of the actuators to position data of the printing carrier, a second step of modifying the data entered into the list in accordance with data regarding the machine status, and with respect to process values relative to a position of the printing carrier at which a performance of an operation should start, a first press operation to be performed being defined and included in the data for every operation is the operation to be performed preceding and subsequent thereto and, upon reaching a starting position of each actual operation to be performed in accordance with actual data from the speed sensor, with the data about the machine status and with the process values, an additional step of redetermining in the computer and entering into the list the data for the position at the start of the performance of the actual operation, and the data for the operation preceding and subsequent to the actual operation, and if a shifting of the performance sequence is necessary, redetermining the data of the preceding, and subsequent operations, and if the redetermined position chronologically comes after the starting position, skipping the respective operation in the performance sequence, and if the redetermined position chronologically comes before the starting position, performing the respective operation from the starting position.

Thus, in accordance with the invention, the starting times for the performance of a press operation and the performance sequence just preceding the performance of an operation in accordance with data regarding the press status and process values are redetermined or recalculated in the computer of the press control and are carried out as required.

To relieve the load on the computer of the press control at high machine speeds and high signal-processing speeds, all of the operations can be redetermined or recalculated together for one or more angular positions of the press, each operation can be redetermined or recalculated separately, i.e., individually, for one or more angular positions of the press, or redeterminations or recalculation can be performed cyclically at defined chronological intervals. In practice, the frequency of redetermination or recalculation is limited only by the computing power.

A decentralized computer structure can be utilized to realize the method according to the invention. In this regard, a separate computer is used to implement the operations associated with each sub-assembly, respectively, such as each printing unit, the sheet feeder, and the delivery, for example, are implemented only on one suitable computer.

Other features which are considered as characteristic for the invention are set forth in the appended claims.

Although the invention is illustrated and described herein as a method of automatically controlling or regulating a chronological sequence of operating activities or operations of a printing press, it is nevertheless not intended to be limited to the details shown, since various modifications and changes may be made therein without departing from the spirit of the invention and within the scope and range of equivalents of the claims.

The method of operation of the invention, however, together with additional objects and advantages thereof will be best understood from the following description of specific modes thereof when read in connection with the accompanying drawings, in which.

Figure 1:
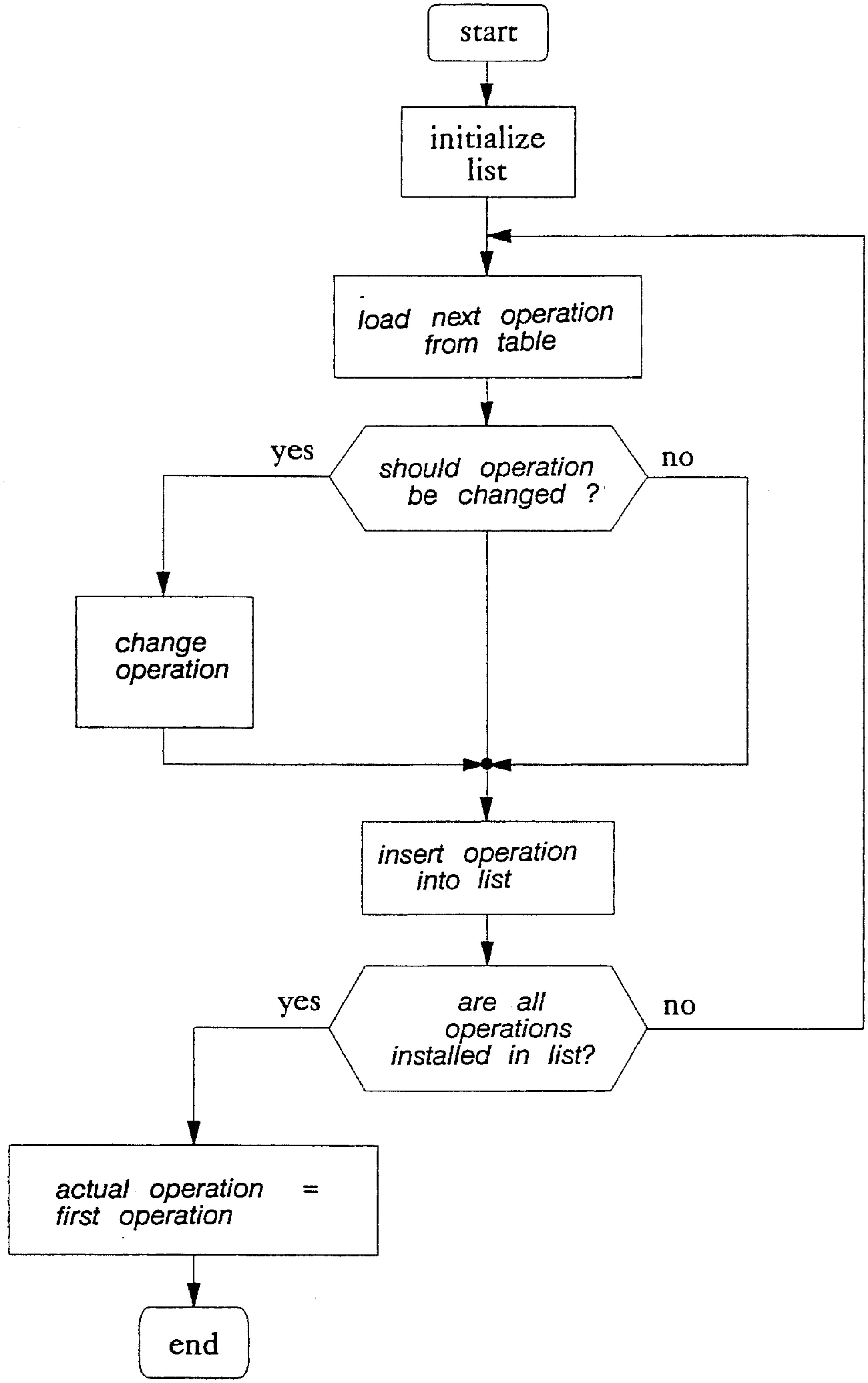
FIG. 1 is a flow chart for the first two steps of the method according to the invention.
Figure 3:
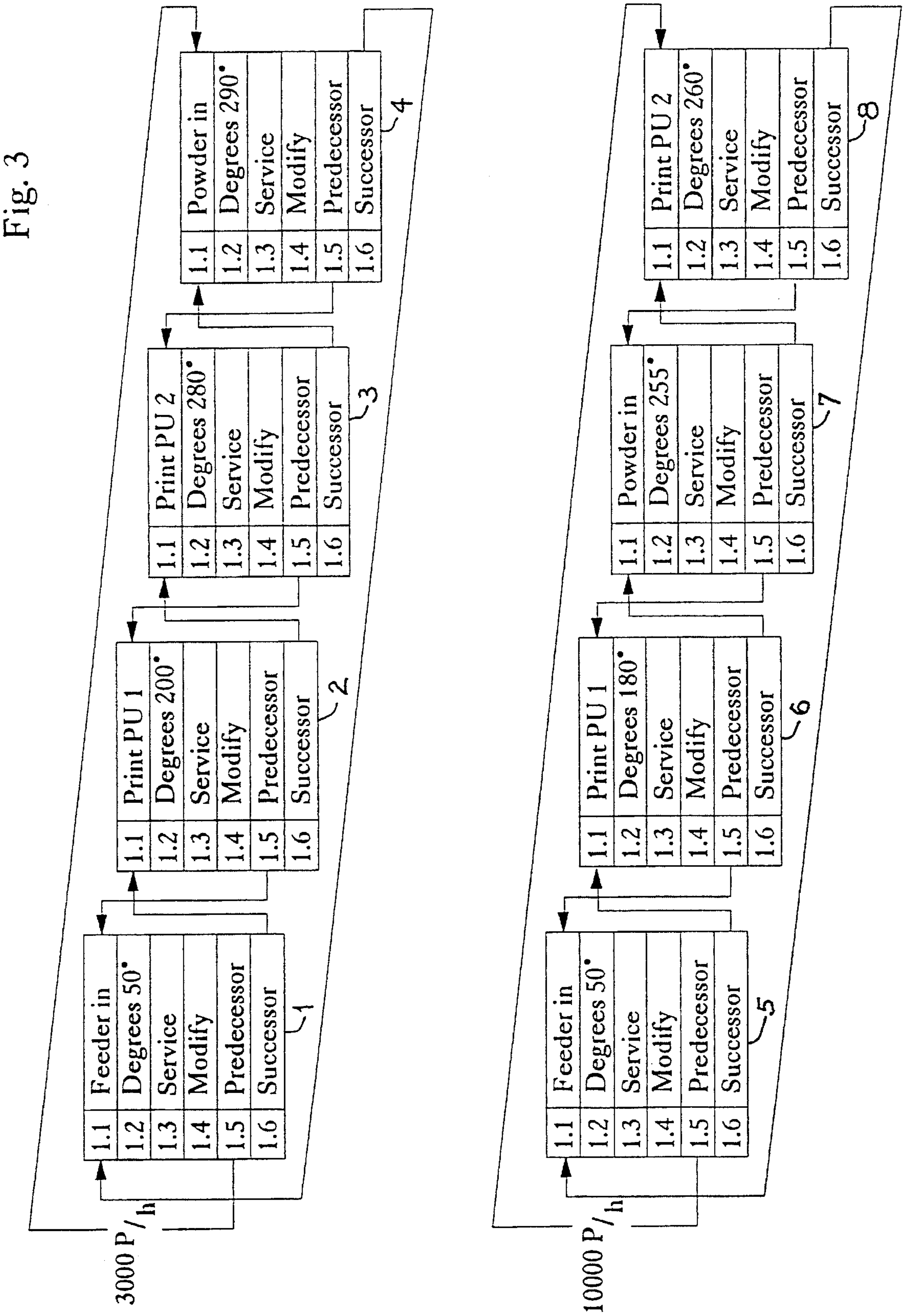
FIG. 3 is a flow diagram for the performance of four operating activities or operations by the press at two different press speeds.

Referring to the drawing and, first, particularly to FIGS. 1 and 3 thereof, there is shown therein a list which must be initialized, in a first step, in an operating memory or RAM of a computer which is a component of a printing-press control. The list includes a table with all operating or processing data necessary for printing, which is loaded from a fixed memory or ROM. The data includes information on a sub-assembly wherein an operation or operating activity is to be performed, the press angle at which, for zero speed, the beginning of the performance of the respective operation should take place, information on whether the operation should be performed and what should be performed during the operation, information on whether and how the operation should be modified and information regarding the preceding and subsequent operations. During orderly transport of the printing material or stock, the machine angle can be used to determine the position of the printing material relative to a reference location.

In a further step, the data entered into the list can be modified in accordance with data regarding press and process values. In this regard, a first operation to be performed is determined and, using the press and process values, a check is made to determine whether or not the data for this operation should be modified. The data for the preceding and subsequent operations, as well as the data of the preceding and subsequent operations are modified so that the then current operation is inserted into the list in accordance with its proper sequence.

This pre-processing is performed, in turn, for all of the operations. The first operation to be performed after pre-processing is defined as the starting operation for the further performance of the method according to the invention. Changes or modifications in data of operations during pre-processing can, for example, result from changes in data relating to process values, such as press operation with turning and operation of a varnish unit.

Figure 2:
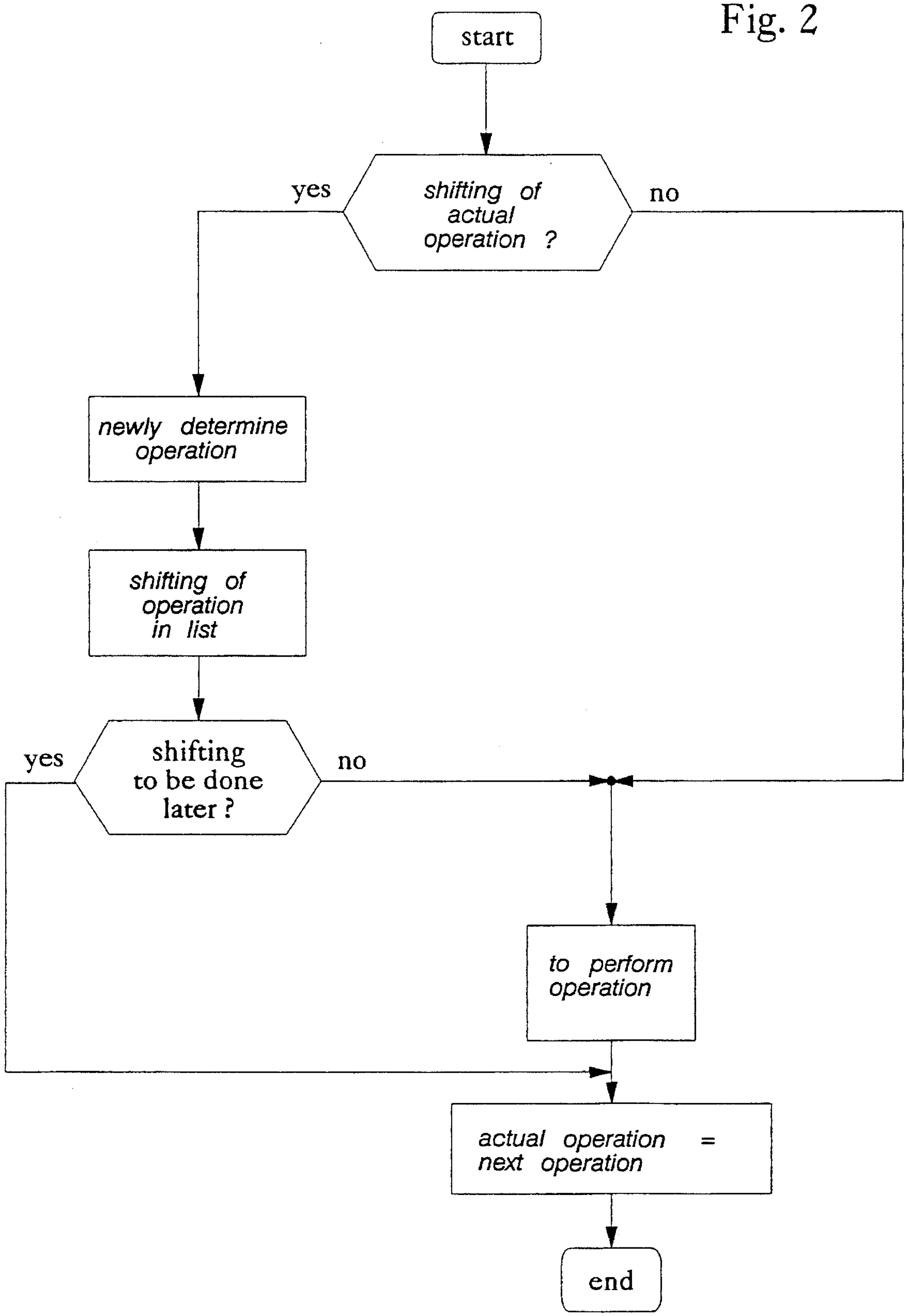
FIG. 2 is a flow chart for the subsequent method steps.

FIG. 2 schematically illustrates the further sequence of steps in the method according to the invention. When the press begins printing, i.e., the press speed is greater than zero, every time the start position and the starting press angle, respectively, for each operation to be performed is reached, the pressman or other personnel checks whether the operation should be delayed due to the actually existing or then current press and process or operation values of the specific operation with respect to the press angle at which the corresponding operation should be performed, or must be shifted in the list with respect to the sequence of the performance thereof, the press speed being accordingly incorporated as a parameter into the checking step of the method according to the invention. If the check establishes that the performance sequence must be modified, the data for the operations changed in performance sequence must be pushed back in the list. When the data for a specific operation is shifted, the data of the preceding and subsequent operations both prior to and after the shift must be recalculated. If the newly determined position of an operation comes chronologically after the original starting position thereof, that operation is by-passed in the performance sequence. If the newly determined position comes chronologically before the starting position, that operation is performed.

In FIG. 3, the effect of the method of the invention with respect to the performance of four operations at two different press speeds is represented. The data for a specific operation at a press speed of 3,000 prints per hour (P/h) are shown schematically in blocks 1, 2, 3 and 4, and the data for a specific operation at a press speed of 10,000 P/h are shown in Blocks 5, 6, 7 and 8. The first field 1.1 of each block 1 to 8 contains data regarding the location and sub-assembly, respectively, in which the operation is performed. The second field 1.2 of each block 1 to 8 contains the printing-press angle at which performance of the respective operation begins. The third field 1.3 contains data necessary for the execution of the operation. The fourth field 1.4 contains data which is necessary for modification of the other fields. In two other fields 1.5 and 1.6, data are contained for the indicator or pointer to the preceding and subsequent operation. The chart of FIG. 3 illustrates how the method according to the invention can be applied to modify the performance sequence of the press operations and the data in the indicated fields based upon various existing press speeds.

We claim:

1. Method of automatically controlling and timing a chronological sequence of process steps of a printing press in accordance with data defining the operations of the printing press wherein the data include on-line data, off-line data, press operation data, press status data, carrier speed data, and carrier position data, the method which includes continuously sensing the carrier position data for a printing carrier with respect to a reference location by means of a digital position sensing system, continuously sensing the transport speed of the printing carrier along a transport path, a printing speed of the printing press, or a speed of elements in a drive system of the printing press by means of a digital speed sensor, inputting the carrier position data from the position sensing system and the speed data from the digital speed sensor into a computer constituting a component of a control of the printing press, inputting additional on-line data regarding the printing press status from respective sensors, and off-line data for process values into the computer, and relaying speed-dependent and acceleration-dependent signals to actuators for initiating process steps of the printing press by means of an electronic output unit connected to the computer, when the printing carrier reaches a given position, the method which comprises:

(a) initializing in a first step of the method in a RAM in the computer a list, the list including a table for all data necessary for performing the process steps relating to printing, including an assignment of the starting time data for setting elements to position data for the printing carrier, (b) changing in a second step of the method the data in the list in dependence on the press status data relating to the press states and to the process parameters relating to the positions at which the start of the process steps are to begin, and determining a first process step to be performed, wherein the data for each process step, respectively preceding and following said first process step are included, (c) redetermining with the computer in a further step of the method, upon reaching the start position of each process step to be performed in dependence on the carrier speed data from the digital speed sensor, from the press status data regarding the press states, and from the process parameters, the data for the position for the start of processing of the respective process step for the process steps preceding and following said process step; and wherein next, if a shift in sequence of performing the process steps is required, redetermining the data for the resulting respective preceding and following process steps, (d) if the redetermined position chronologically comes after the starting position, skipping the respective process step in the performance sequence, and (e) if the redetermined position chronologically comes before the starting position, performing the respective process step from the starting position.

* * * * *